April 7, 1970 P. J. GEERLINGS ET AL 3,504,654
TRIP FEEDER FOR LIVESTOCK
Filed May 4, 1967
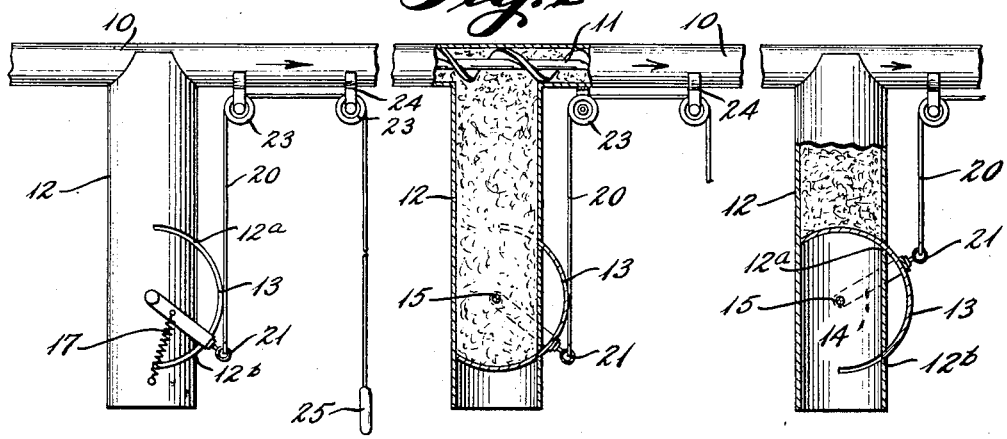
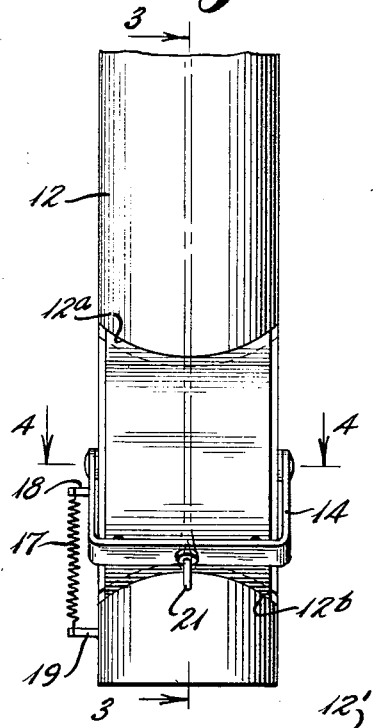
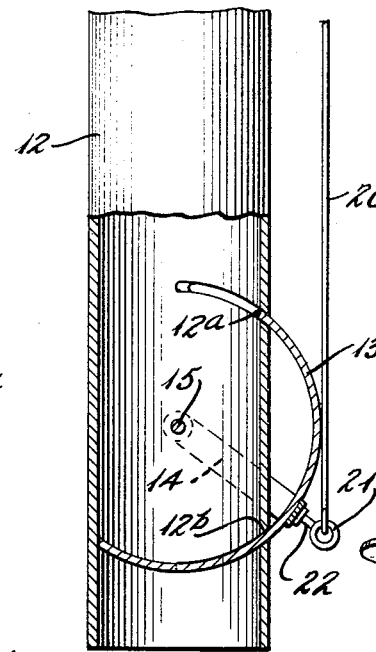
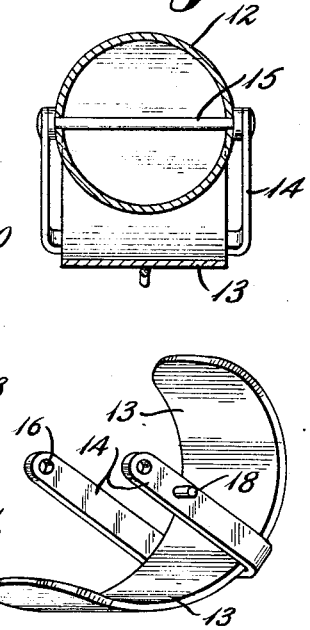
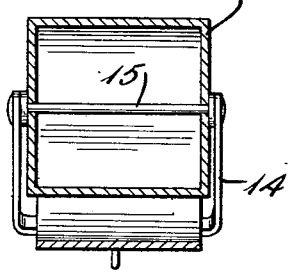
INVENTORS
PETRUS J. GEERLINGS
JOSEPH J. HOFFMAN
BY
ATTORNEYS United States Patent Office 3,504,654
Patented Apr. 7, 1970

3,504,654
TRIP FEEDER FOR LIVESTOCK
Petrus J. Geerlings, Waterloo, and Joseph Jacob Hoffmann, Charlotte, Iowa; Leola Hoffmann, executrix of the estate of Joseph Hoffmann, deceased, assignor of fifty percent to Leola Hoffmann, as legatee
Filed May 4, 1967, Ser. No. 636,064
Int. Cl. A01k 5/00
U.S. Cl. 119—56                              2 Claims

ABSTRACT OF THE DISCLOSURE

A conveyor which supplies a group of hoppers with individual uniformly curved discharge gates mounted to swing from a position normally retaining the feed in the hoppers to a second position to release a predetermined quantity of feed while simultaneously interrupting the flow from said hopper.

SUMMARY

This invention relates to the feeding of livestock and to equipment by which such feeding may be accomplished.

It is an object of the invention to provide simple, inexpensive, practical, labor-saving equipment, including a conveyor or other means supplied group of hoppers or containers for feed with discharge openings and a gate or closure for alternately opening and closing such discharge openings while each of which can be operated by a pull cord to release feed and block the discharge from the hopper to limit the amount of feed discharged, as well as to provide individual hoppers for supplying, for for example, independently supplying of feed from the several hoppers.

Other objects and advantages of the invention will be apparent from the following description taken in conjunction with the accompanying drawing in which:

BRIEF DESCRIPTION OF DRAWINGS

FIG. 1 is a fragmentary side elevation illustrating one application or embodiment of the invention;

FIG. 2, a side elevation of one of the hoppers of FIG. 1;

FIG. 3, a longitudinal section on the line 3—3 of FIG. 2;

FIG. 4, a transverse section on the line 4—4 of FIG. 2;

FIG. 5, a perspective of the gate or closure; and,

FIG. 6, a cross-section of a modified construction in which the hopper is square in cross-section instead of round.

With continued reference to the drawing a conveyor of any desired character is provided, as for example, a conveyor 10 having an internal screw 11 to which feed is supplied from any desired source to a series of hoppers 12. In order to retain the feed within each of the hoppers or containers 12 an elongated uniformly curved dispensing gate 13 is provided designed to discharge a predetermined amount of feed while simultaneously interrupting the flow of feed from the hopper to the discharge area thereof.

In order to accomplish this purpose the gate is uniformly curved and is supported by a yoke having spaced parallel arms 14 mounted on a shaft 15 so that the gate will swing into slots 12a and 12b across the discharge opening of the hopper. The lower portion of the gate opens alternately with the closing of the upper curved portion thereof to allow the discharge of feed and to shut off the flow from the hopper. In other words, the door or gate 13 is curved so that as the arms 14 are swung about the shaft 15 the lower end of the gate will be retracted permitting the feed accumulated adjacent to it to drop by gravity while at the same time the upper end of the gate will move across the discharge opening from the hopper permitting only a predetermined amount of the feed accumulated below it to be discharged.

The closure or gate 13 may be urged toward closed position in any desired manner as, for example, by means of a spring 17 attached to one of the arms 14 in any desired manner as, for example, by having one end of the spring attached to a stud 18, while the opposite end of the spring is attached to the hopper 12 in fixed position in any desired manner as, for example, by means of a stud 19.

Where a group or series of hoppers are employed for the feeding of a number of animals, for example cows, a quantity of feed is contained in the lower portion of each of the hoppers and may be discharged by the swinging of the gate 13. The gate may be swung in any desired manner, as for example, by means of a cable 20 which may be attached by means of a ring 21 and a post 22 to the yoke carrying the arms 14. The cable 20 may be extended to a remote location as, for example, over pulleys 23 attached by brackets 24 to an overhead support such as the conveyor 10 and the end of the cable may be provided with an operating handle 25. Upon a jerk or quick downward pull on the cable, against the action of the spring 17, feed in the lower portion of the hopper between the bottom and upper portions of the gate will be allowed to flow downwardly by gravity as the lower end of the gate is retracted, while at the same time the upper end of the gate is moved across the discharge from the hopper to prevent excess feed from being discharged. As soon as the accumulated feed in the area of the gate has been discharged, release of the handle will permit the spring 17 to return the gate to its initial position so that more feed may flow into the area of the gate.

The hopper 12 may be round as illustrated in FIGS. 1–4, or if preferred a hopper 12′ of square or rectangular cross-section may be provided, as illustrated in FIG. 6. When the hopper is round the extremities of the gate 13 will be complementarily rounded, but when the hopper is of square or rectangular cross-section, the ends of the gate will be of a corresponding configuration to fit closely to the surfaces of the hopper, or in other words, it will not be necessary in the square hopper to round the ends of the gate but merely retain them straight at right angles to the sides of the gate.

It will be apparent from the foregoing that any number of hoppers may be provided of the same or different sizes and supplied from one or more conveyors or other sources, and such hoppers may be operated independently or in conjunction with the other hoppers and as often as is needed to supply the proper amount of feed to the livestock.

What is claimed is:

1. A trip feeder for livestock comprising a horizontally disposed screw conveyor having a supply of feed at one end, at least one generally cylindrical hopper connected at one end to said screw conveyor and adapted to receive feed therefrom, the longitudinal axis of said hopper being disposed along a generally vertical plane, a generally U-shaped yoke swingably mounted at opposite ends along a horizontal axis on the exterior of said hopper and intermediate the ends thereof, an elongated uniformly curved dispensing gate having spaced end portions and an intermediate portion, the intermediate portion of said gate being mounted on the intermediate portion of said yoke, the radius of curvature of said gate being substantially larger than the radius of said hopper so that portions of said gate are disposed exteriorly of said hopper, said gate being of a width generally corresponding to the inner diameter of said hopper, said vertically disposed hopper having horizontally extending openings, the ends of said gate extending through said openings and being curved to cooperatively engage the inner surface of said hopper, said gate being of a length to have one end retracted from said hopper when the opposite end is in engagement with the inner surface of said hopper, cable means connected to said gate and adapted to rotate said gate so that said one end extends across said hopper while said opposite end is retracted in a manner that the ends of said gate will successively obstruct flow of feed through said hopper, and means urging said gate toward a first feed obstructing position, whereby operation of said cable means will move said gate to a second feed obstructing position to dispense a predetermined amount of feed from said hopper.

2. The structure of claim 1 in which said means urging said gate includes spring means connected at one end to said yoke and connected at the opposite end to said hopper.

References Cited

UNITED STATES PATENTS

| | | | |
|---|---|---|---|
| 742,969 | 11/1903 | Clapp | 119—51.11 X |
| 760,482 | 5/1904 | Ray et al. | 119—51.15 |
| 811,573 | 2/1906 | McIntyre | 119—56 |
| 858,935 | 7/1907 | Yost | 119—56 |
| 1,392,311 | 10/1921 | Egeland | 119—51.11 X |
| 2,743,860 | 5/1956 | Saxe | 226—94 |
| 3,088,437 | 5/1963 | Willems | 119—56 |

ALDRICH F. MEDBERY, Primary Examiner